US005467165A

United States Patent [19]

Jacob et al.

[11] Patent Number: 5,467,165

[45] Date of Patent: Nov. 14, 1995

[54] MASKING OF PHOTOGRAPHS FOR REPRODUCTION

[75] Inventors: Friedrich Jacob; Wolfgang Zahn, both of Munich, Germany

[73] Assignee: Agfa-Gevaert Aktiengesellchaft, Leverkusen, Germany

[21] Appl. No.: 139,430

[22] Filed: Oct. 20, 1993

[30] Foreign Application Priority Data

Oct. 29, 1992 [DE] Germany .............................. 42 36 568

[51] Int. Cl.[6] .................................................. G03B 27/72

[52] U.S. Cl. .............................. 335/40; 355/71; 355/125; 355/212

[58] Field of Search .............................. 355/40, 71, 210, 355/212, 125; 430/5, 396, 31; 358/302; 356/443, 444

[56] References Cited

U.S. PATENT DOCUMENTS

| | | | |
|---|---|---|---|
| 3,604,326 | 9/1971 | James, III et al. | 430/396 |
| 4,135,807 | 1/1979 | Moraw | 355/9 |
| 4,239,385 | 12/1980 | Hujer | 355/71 |
| 4,647,182 | 3/1987 | Pierce | 355/326 R |
| 4,723,138 | 2/1988 | Hashimoto | 346/160 |
| 5,155,524 | 10/1992 | Oberhardt et al. | 355/71 X |
| 5,164,765 | 11/1992 | Strobel et al. | 355/71 X |

*Primary Examiner*—Joan H. Pendegrass
*Attorney, Agent, or Firm*—Darby & Darby

[57] ABSTRACT

The frames of a film are scanned and exposure data, as well as masking data, are calculated for each frame from the resulting measurements. Following scanning, the frames are successively transported to a printing station. As a frame approaches the printing station, a mask is generated for the frame based on the respective masking data. The mask is produced by selectively roughening the surface of a transparent endless band or selectively applying a dye or pigment to the surface of the band. The band travels along an endless path which passes through the printing station, and movement of a mask and its corresponding frame are coordinated so that the frame is properly masked in the printing station. The masked frame is printed, and mask and frame are then withdrawn from the printing station while a succeeding frame and mask enter the printing station. If a dye or pigment is used for mask formation, the band can be conducted through a cleaning station where masks are removed after printing. The band can then be reused.

15 Claims, 1 Drawing Sheet

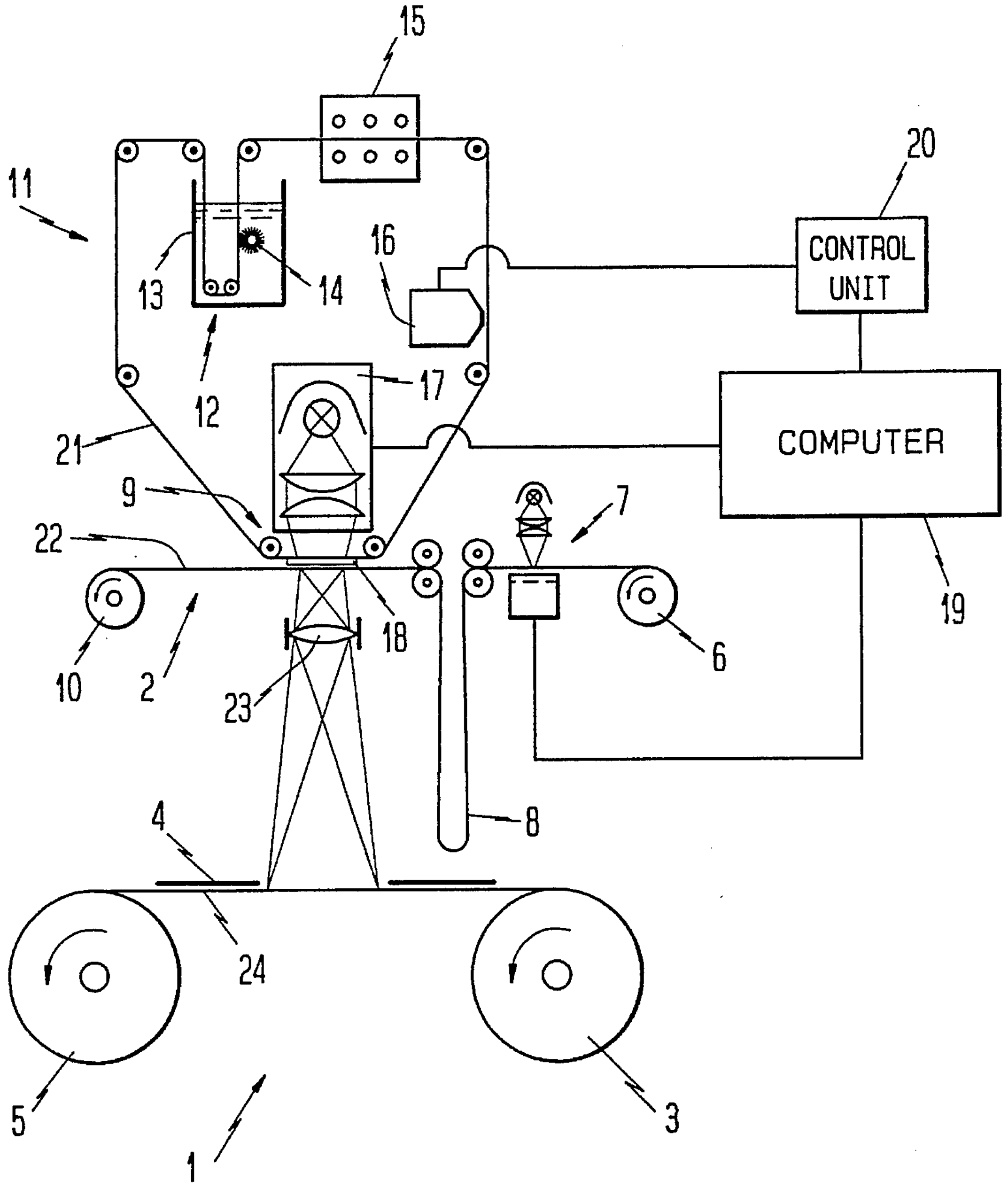
15
20
11
CONTROL
UNIT
16
13
14
12
17
21
COMPUTER
9
7
22
18
10
2
23
6
19
8
4
24
5
3
1

MASKING OF PHOTOGRAPHS FOR REPRODUCTION

CROSS-REFERENCE TO RELATED APPLICATION

This application discloses subject matter similar to that in copending application Ser. No. 07/804/,844 of Wolfgang Zahn et al. filed Dec. 6, 1991 for "Method of and Apparatus for Masking a Master for Reproduction".

FIELD OF THE INVENTION

The invention relates to the reproduction of masters.

BACKGROUND OF THE INVENTION

When printing photographs or masters having individual areas with large differences in brightness, the prints are frequently overexposed in the light regions and underexposed in the dark regions. As a result, details and fine structures are not, or are only poorly, reproduced on the prints.

The German Offenlegungsschrift 31 41 263 describes a method of copying color diapositives on reversal paper using masks for contrast reduction. The diapositive is placed in direct contact with a phototropic sheet of glass and ultraviolet radiation or the like is then passed through the diapositive into the phototropic sheet. A black-and-white negative mask of the diapositive is thus produced in such sheet. With the mask and the diapositive in the same relative position, radiation is thereupon passed through the composite of mask and diapositive in the opposite direction. In this manner, the diapositive is printed on the reversal paper with low contrast.

It has now been found that phototropic glass is not color neutral. This means that darkening of the glass causes different spectral portions of the printing light to undergo different reductions in intensity.

Another photographic printing apparatus designed for masking is disclosed in U.S. Pat. No. 4,239,385. According to this patent, the mask is generated on an LCD matrix which can be regulated by an electronic control unit and is disposed between the illuminating system and a photograph to be printed.

Here, again, there is the problem of color shifting upon darkening of the LCD matrix. A further problem in the apparatus of the U.S. patent stems from the temperature-dependence of LCD displays. Since the degree of darkening of the matrix varies with temperature, reproducible control is very difficult to achieve.

SUMMARY OF THE INVENTION

It is an object of the invention to provide a method which allows color shifting upon masking to be reduced or eliminated.

Another object of the invention is to provide a method which enables masking to be accomplished with a high degree of reproducibility.

An additional object of the invention is to provide an apparatus which makes it possible to reduce or eliminate color shifting when masking.

A further object of the invention is to provide an apparatus which permits masking to be carried out with good reproducibility.

The preceding objects, as well as others which will become apparent as the description proceeds, are achieved by the invention.

One aspect of the invention resides in a method of reproducing a master which comprises the steps of masking the master and printing the masked master. The masking step includes treating a surface zone to generate a mask for the master and such treatment comprises selectively applying a coating to the surface zone or selectively altering the structure of the surface zone. The mask will generally be individually tailored to the master.

The master can be transparent and can be constituted by a photograph. Printing of the master can be carried out on light-sensitive paper.

The coating applied to the surface zone may include a particulate substance with preferred coating materials being dyes and pigments. By way of example, application of the coating can be carried out magnetically, electrophotographically, by means of a vapor recording process or by means of a thermodye transfer process.

When treatment of the surface zone includes coating of the latter, the method may further comprise the step of cleaning the surface zone following the printing step. The surface zone may then be used to repeat the masking step for an additional master.

In the event that treatment of the surface zone involves altering the structure thereof, such alteration may include making selected areas of the surface zone light-diffusing.

The surface zone preferably constitutes a surface zone of a transparent element. For instance, the surface zone can be provided on a glass plate or sheet. Advantageously, the surface zone of the glass plate, or the entire glass plate, is light-diffusing.

The masking step may involve moving the surface zone along an endless path. Here, the surface zone can constitute a surface zone of an endless foil which moves in the endless path.

It is further possible for the surface zone to constitute a surface zone of the master to be printed.

when the surface zone used for masking is not part of the master, the method may additionally comprise the step of maintaining a predetermined spacing between the mask and the master during the printing step.

Another aspect of the invention resides in a method of reproducing a master which comprises the steps of forming a mask on the master and printing the masked master.

A further aspect of the invention resides in an apparatus for reproducing a master, especially a transparent photographic master. The apparatus comprises means for generating a mask for the master and means for printing the masked master. The generating means includes means for selectively applying a coating to a surface zone or selectively altering the structure of a surface zone.

BRIEF DESCRIPTION OF THE DRAWING

Additional features and advantages of the invention will be forthcoming from the following description of certain presently preferred embodiments when read in conjunction with the accompanying drawing.

The sole FIGURE schematically illustrates a printing apparatus in accordance with the invention.

DESCRIPTION OF PREFERRED EMBODIMENTS

A photographic copying or printing apparatus according to the invention, which can be used to carry out a method in accordance with the invention, is shown in the single FIGURE. The apparatus has a conventional guide section 2 in which a filmstrip 22 is conveyed through a printing or copying station 9 and a conventional guide section 1 in which copy material 24 is transported by the station 9. The copy material 24 is in the form of a band of light-sensitive paper.

The filmstrip 22 is made up of several individual films which are joined end-to-end. Each film consists of a series of transparent frames or masters.

The guide section 1 includes a masking plate 4 which is in register with the printing station 9. The guide section 1 further includes a paper supply roll 3 from which unexposed light-sensitive paper 24 is unwound and a paper take-up roll 5 onto which the paper 24 is coiled following exposure. Unexposed segments of the paper 24 are positioned beneath the masking plate 4 for exposure.

The guide section 2 comprises a film supply roll 6 from which the filmstrip 22 is uncoiled. Upon being ucoiled from the supply roll 6, the filmstrip 22 sucessively travels through a measuring station 7, a film storage loop 8 and the printing station 9. After leaving the printing station 9, the filmstrip 22 is wound onto a film take-up roll 10.

Above the printing station 9 is a mask-producing unit 11. The mask-producing unit 11 includes a forming device 16 which operates on a transparent carrier 21 to create masks from the latter. In the illustrated embodiment, the carrier 21 is in the form of an endless masking band which is transported clockwise along an endless path passing through the printing station 9.

The forming device 16 is connected to an electronic control unit 20 which serves to regulate the device 16. The control unit 20 is connected to a computer 19 which, in turn, is connected to the measuring station 7 and an illuminating unit 17 constituting part of the printing station 9. The illuminating unit 17 functions as a source of printing or copy light.

Before the frames of an individual film of the filmstrip 22 are printed, each of the frames is scanned in the measuring station 7 to generate a set of density values. The length of the film storage loop 8 is such that the leading frame of the film has not yet reached the printing station 9 when the trailing frame of the film is in the measuring station 7. This allows a set of density values to be obtained for each frame of the film before the leading frame enters the printing station 9. The computer 19 then uses the density values from all frames of the film to calculate exposure data and a mask for each individual frame, i.e., a unique set of exposure data and masking data is developed for each frame of the film.

The control unit 20 now causes the forming device 16 to produce, on the endless band 21, the mask calculated for the leading frame of the film. The film and the band 21 are advanced in such a manner that the leading frame of the film and its mask are in the printing station 9 concurrently with the mask properly masking the leading frame. The film and the band 21 are held at a predetermined distance from one another in the printing station 9 by a spacer 18.

Once the leading frame and the associated mask are accurately positioned in the printing station 9, the computer 19 activates the illuminating unit 17 to print the leading frame on the light-sensitive paper 24. An objective 23 sharply focuses the leading frame of the film on the paper 24 but, due to the spacer 18, forms an unsharp image of the mask on the paper 24.

It is assumed here that the frames on the filmstrip 22 are negatives. Accordingly, the prints produced on the paper 24 are positives.

While the leading frame is being printed, the forming device 16 generates, on the band 21, the mask calculated for the second frame of the film. Following printing of the leading frame, the mask for the leading frame, as well as the leading frame itself, are conveyed out of the printing station 9 whereas the second frame and its mask enter the printing station 9.

The forming device 16 can generate a mask in different fashions. By way of example, the forming device 16 can produce a mask by selectively changing the surface structure of the band 21. To this end, the surface of the band 21 can, for instance, be roughened in selected areas so that light transmission at these areas is reduced due to increased light diffusion. One possibility for roughening the surface of the band 21 is to subject the band 21 to a thermal treatment by means of a laser scanner. Another toughening procedure involves treatment of the band 21 with a solvent, e.g., using an ink-vapor recorder operated with solvent.

The forming device 16 can also function to create a mask by selectively applying a coating to the surface of the band 21. The device 16 then includes a source of coating material. Preferred coating materials are dyes and pigments.

When a mask is to be formed from a dye or a pigment, it is particularly advantageous for the band 21 to be in the form of a foil. The mask can be applied without fixing, for example, so that it can be removed in a cleaning station 12 following printing of the corresponding frame. The cleaning station 12, which is located downstream of the printing station 9 as considered in the direction of travel of the band 21, includes a treatment tank 13 and a rotating brush 14. A dryer 15 is disposed downstream of the cleaning station 12.

After a frame has been printed, the associated mask is advanced through the cleaning station 12 as additional frames are printed and the corresponding masks produced by the forming device 16 are transported to the printing station 9. At the cleaning station 12, the used mask can be removed from the band 21 in the treatment tank 13 via a suitable solvent and the mechanical action of the rotary brush 14. The band 21 is subsequently dried in the dryer 15 so that it can be provided with new masks.

Instead of a foil, a glass plate or sheet can be used as a carrier for a mask. The glass plate is advantageously light-diffusing or at least has a light-diffusing surface. In the latter case, the mask should be applied to such surface. If the glass plate has a certain thickness, the spacer 18 can be eliminated. For automatic operation, a series of glass plates can be connected to one another so as to form the endless band 21.

The forming device 16 can be designed to apply liquid or particulate toner to the band 21 using an electrophotographic procedure known per se. If the fixing undertaken in conventional copying apparatus is dispensed with, the toner can again be removed after printing and the band 21 reused.

It is further conceivable to construct the forming device 16 as an ink-vapor recorder which imprints the band 21 with a dye or pigment. Here, also, cleaning of the band 21 after printing is possible.

An additional possibility is to provide the band 21 with a magnetizable layer such as is used, by way of example, for the storage of information on photographic films. The forming device 16 then can be designed to magnetize this layer in accordance with the shape of a mask. If the band 21 is now brought into contact with a dye or a powdered pigment having ferromagnetic properties, a visible image of the latent mask is produced in the magnetizable layer. By demagnetizing and stripping the band 21 subsequent to printing, the band 21 can be reused as before.

It is also feasible to employ the so-called thermodye process for mask production. In this case, the forming device 16 comprises a light source which images a frame to be printed on a light-sensitive foil. The exposed dye of this foil is thereafter transferred to the masking band 21 by pressure and heat. The band 21 here cannot be used again.

For a mask consisting, for instance, of removable unfixed toner, it is not absolutely necessary to provide a separate mask carrier such as the band 21. Thus, the mask can be applied directly to the corresponding frame. However, care should be excercised to insure that the resolution of the mask lies in the region of the resolution of the frame. If the resolution of the mask were lower, it would be visible on the print of the frame.

The spacer 18 interposed between the film and the masking band 21 in the printing station 9 is intended to prevent reproduction on the copy paper 24 of graininess present in the roughened surface of the band 21 or in the dye or pigment applied thereto. By maintaining the film and the band 21 at a distance from one another, the spacer 18 causes a mask to be imaged on the paper 24 unsharply so that the boundaries between grains are not visible on the print of the corresponding frame.

If a foil is used for the band 21, the spacer 18 can, for example, be in the form of a diffusing screen.

By forming masks on a transparent carrier using the method and apparatus of the invention, it becomes possible to select a carrier which is essentially completely color neutral.

Without further analysis, the foregoing will so fully reveal the gist of the present invention that others can, by applying current knowledge, readily adapt it for various applications without omitting features that, from the standpoint of prior art fairly constitute essential characteristics of the generic and specific aspects of our contribution to the art and, therefore, such adaptations should and are intended to be comprehended within the meaning and range of equivalence of the appended claims.

We claim:

1. An apparatus for reproducing a master, comprising means for generating a contrast reducing mask for the master, said generating means including means for selectively applying a coating to a surface zone or selectively altering the structure of a surface zone; and means for copying the masked master.

2. The apparatus of claim 1, wherein said generating means comprises means for selectively applying a dye or pigment coating to a surface zone.

3. The apparatus of claim 1, wherein said generating means comprises means for selectively applying a particulate coating to a surface zone.

4. The apparatus of claim 1, wherein said generating means comprises a transparent element for surface treatment by said applying or altering means.

5. The apparatus of claim 1, further comprising means for maintaining a predetermined spacing between the master and mask in said printing means.

6. The apparatus of claim 1, further comprising means for moving a surface zone along an endless path.

7. The apparatus of claim 1, wherein said generating means comprises a glass plate for surface treatment by said applying or altering means.

8. The apparatus of claim 7, wherein said plate is light-diffusing.

9. The apparatus of claim 7, wherein said plate has a light-diffusing surface zone.

10. The apparatus of claim 1, wherein said generating means comprises means for selectively applying a coating to a surface zone electrophotographically.

11. The apparatus of claim 1, wherein said generating means comprises means for selectively applying a coating to a surface zone magnetically.

12. The apparatus of claim 1, wherein said generating means comprises means for selectively applying a coating to a surface zone; and further comprising means for removing the coating following printing.

13. An apparatus for reproducing a master, comprising means for generating a mask for the master, said generating means including means for selectively applying a coating to a surface zone or selectively altering the structure of a surface zone; means for moving a surface zone along an endless path, said generating means further including an endless foil in said path in driving engagement with said moving means; and means for printing the masked master.

14. An apparatus for reproducing a master, comprising means for generating a mask for the master, said generating means including means for selectively applying a coating to a surface zone using vapor; and means for printing the masked master.

15. An apparatus for reproducing a master, comprising means for generating a mask for the master, said generating means including means for selectively applying a coating to a surface zone by a thermodye transfer process; and means for printing the masked master.

* * * * *